United States Patent
Statler, III et al.

(10) Patent No.: US 9,797,535 B2
(45) Date of Patent: Oct. 24, 2017

(54) BONDING CLIP FOR FLUID CONDUIT COUPLING

(71) Applicant: EATON CORPORATION, Cleveland, OH (US)

(72) Inventors: Richard Lowell Statler, III, Denver, CO (US); Clifton P. Breay, Littleton, CO (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/782,615

(22) PCT Filed: Apr. 15, 2014

(86) PCT No.: PCT/US2014/034197
§ 371 (c)(1),
(2) Date: Oct. 6, 2015

(87) PCT Pub. No.: WO2014/172370
PCT Pub. Date: Oct. 23, 2014

(65) Prior Publication Data
US 2016/0069495 A1 Mar. 10, 2016

Related U.S. Application Data

(60) Provisional application No. 61/812,479, filed on Apr. 16, 2013.

(51) Int. Cl.
*F16L 39/00* (2006.01)
*F16L 37/12* (2006.01)
(Continued)

(52) U.S. Cl.
CPC ......... *F16L 37/1215* (2013.01); *F16L 23/006* (2013.01); *F16L 25/0018* (2013.01); *F16L 25/01* (2013.01)

(58) Field of Classification Search
CPC .................................................. F16L 37/1225
(Continued)

(56) References Cited

U.S. PATENT DOCUMENTS

| 874,378 A | 12/1907 | Allen |
|---|---|---|
| 883,220 A | 3/1908 | Middlebrook |

(Continued)

FOREIGN PATENT DOCUMENTS

WO  WO 2012088055  6/2012

OTHER PUBLICATIONS

"Part 4566-54001/ESC—Couplings and Accessories—Hose Safety Clips," Ace Hose & Rubber Company, 2011, retrieved from http://acehose.com/mcart/index.cgi?code=3&cat=4 (p. 5), 30 pages.

(Continued)

*Primary Examiner* — Aaron Dunwoody
(74) *Attorney, Agent, or Firm* — Fishman Stewart PLLC (57) ABSTRACT

A bonding clip is provided in combination with a fluid conduit coupling that interconnects fluid conveying members. The bonding clip conducts electrical charge across the coupling to prevent buildup of electrostatic charges in the coupling. In one aspect of the invention, it may be considered a bonding clip. In another aspect, it may be considered the combination including the bonding clip and coupler. The invention also includes a method for dissipating electrostatic charge across a coupling used to interconnect fluid conveying members. In a preferred embodiment of the bonding clip, it includes a continuous flexible wire element mounted exteriorly of the coupling. The bonding clip is formed in a shape to connect the facing flanges of adjacent fluid conveying lines connected by the coupler, and to pass over the coupler with a defined gap separating a bridge portion of the clip from exterior surfaces of the coupler.

14 Claims, 7 Drawing Sheets

(51) Int. Cl.
*F16L 25/01* (2006.01)
*F16L 23/00* (2006.01)
*F16L 25/00* (2006.01)

(58) Field of Classification Search
USPC .............. 285/82, 92, 319, 321; 24/3.12
See application file for complete search history.

(56) References Cited

U.S. PATENT DOCUMENTS

| | | | |
|---|---|---|---|
| 1,424,139 A * | 7/1922 | Loman ................ | A45F 5/02 24/3.12 |
| 2,218,756 A * | 10/1940 | Knoerzer ............ | F16L 37/1225 285/110 |
| 2,557,518 A * | 6/1951 | Simpson ............. | H04R 25/04 24/3.12 |
| 2,852,825 A * | 9/1958 | Ballou, Jr. .......... | A45F 5/02 24/3.12 |
| 3,224,800 A * | 12/1965 | Fisher ................ | A47B 91/024 285/315 |
| 3,335,399 A | 8/1967 | Rys | |
| 3,403,930 A * | 10/1968 | Bernier .............. | H01R 13/62 285/315 |
| 3,469,864 A * | 9/1969 | Guerrero ............ | F16L 37/1225 24/339 |
| 3,479,069 A * | 11/1969 | Sedam ............... | F16L 37/1225 285/364 |
| 3,753,582 A * | 8/1973 | Graham ............. | F16L 37/088 24/573.11 |
| 3,891,291 A | 6/1975 | Nadsady et al. | |
| 3,995,897 A | 12/1976 | Paskert | |
| 4,008,937 A | 2/1977 | Filippi | |
| 4,346,428 A | 8/1982 | Gale | |
| 4,402,534 A * | 9/1983 | Keenan .............. | B60T 17/043 285/69 |
| 4,487,462 A | 12/1984 | Gale et al. | |
| 4,553,799 A | 11/1985 | Deters | |
| 4,699,403 A * | 10/1987 | Wong ................. | F16L 37/12 285/233 |
| 4,808,117 A | 2/1989 | Gale et al. | |
| 4,881,760 A | 11/1989 | Runkles et al. | |
| 4,900,070 A * | 2/1990 | Runkles et al. ..... | F16L 37/133 285/233 |
| 5,188,400 A | 2/1993 | Riley et al. | |
| 5,309,609 A | 5/1994 | Janiszewski et al. | |
| 5,350,201 A | 9/1994 | Bynum | |
| 5,620,210 A | 4/1997 | Eyster et al. | |
| 5,645,303 A | 7/1997 | Warehime et al. | |
| 5,786,976 A | 7/1998 | Field | |
| 5,799,986 A | 9/1998 | Corbett et al. | |
| 5,871,239 A | 2/1999 | Boscaljon et al. | |
| 5,959,828 A | 9/1999 | Lewis et al. | |
| 6,073,973 A | 6/2000 | Boscaljon et al. | |
| 6,612,619 B2 | 9/2003 | Wieder | |
| 6,681,458 B2 * | 1/2004 | Seymour ........... | H01R 13/6335 24/634 |
| 6,880,859 B2 | 4/2005 | Breay et al. | |
| 6,883,836 B2 | 4/2005 | Breay et al. | |
| 7,222,889 B2 | 5/2007 | Breay | |
| 7,631,904 B2 * | 12/2009 | Heim et al. ........ | F16L 37/088 285/305 |
| 8,215,678 B2 | 7/2012 | Peachey | |
| 8,220,113 B2 | 7/2012 | Morton et al. | |
| 8,435,058 B2 | 5/2013 | Franke | |
| 8,585,096 B2 * | 11/2013 | Schnell et al. ..... | A61M 39/1011 285/114 |
| 2006/0145475 A1 | 7/2006 | Walker et al. | |
| 2010/0025079 A1 | 2/2010 | Flynn | |
| 2010/0090461 A1 * | 4/2010 | Spielmann ......... | F16L 37/144 285/321 |
| 2010/0205782 A1 * | 8/2010 | Caniparoli ......... | F21L 4/005 24/3.12 |
| 2011/0101674 A1 | 5/2011 | Benvenuto et al. | |
| 2012/0161434 A1 | 6/2012 | Wells | |

OTHER PUBLICATIONS

International Search Report and Written Opinion for International (PCT) Patent Application No. PCT/US14/34197, mailed Aug. 22, 2014, 7 pages.

Preliminary Report on Patentability for International (PCT) Patent Application No. PCT/US14/34197, mailed Oct. 29, 2015, 6 pages.

* cited by examiner

BONDING CLIP FOR FLUID CONDUIT COUPLING

CROSS REFERENCE TO RELATED APPLICATION

This application is a national stage application under 35 U.S.C. 371 of PCT Application No. PCT/US2014/034197 having an international filing date of Apr. 15, 2014, which designated the United States, which PCT application claimed the benefit of U.S. Application Ser. No. 61/812,479, filed Apr. 16, 2013, both of which are incorporated by reference in their entirety.

GOVERNMENT LICENSE RIGHTS

This invention was made with US government support under contract N00019-06-C-0081 awarded by the Department of the Navy-Naval Air Systems Command. The US government has certain rights in the invention.

FIELD OF THE INVENTION

The invention relates to couplings that interconnect fluid conveying members, and more particularly, to an electrically conductive bonding clip for a fluid conduit coupling to dissipate electrical charges associated with fluid conveying members and couplers that interconnect the fluid conveying members.

BACKGROUND OF THE INVENTION

There are a wide variety of couplers/couplings used to interconnect fluid conveying lines. Many couplings are designed to handle special safety requirements. Particularly for fluid lines that convey fuel, there are safety requirements that require a coupling that interconnects the lines be capable of conducting electrical charge through the coupling to ensure that an electrostatic charge does not build up on one of the coupled sections of the lines. It is well known that a stored electrostatic charge can give rise to the hazard of an electrical spark in the presence of vaporized fuel. Discharge of the spark by grounding, or by flexing of the coupling that may bring metallic parts of the coupling into contact with one another may result in instantaneous combustion of vaporized fuel. This combustion can in turn cause ignition of the fuel conveyed in the lines, resulting in a catastrophic fire or explosion. Buildup of electrostatic charge by ionization of fuel as it is conveyed through the lines continues to be a concern for all fuel lines, especially within aircraft. Lightning strikes can also generate spark, and such strikes may be referred to as a dynamic cause of electrical charge. Thus, a coupler used within a system of fuel conveying lines must have the capability to dissipate all types of electrical charges that may be present. Particularly for lightning strikes, it is important that the coupler have the ability to quickly dissipate electrical charge due to the potential magnitude of a spark caused by the lightning strike.

Most coupler designs presently utilize metallic flanges that are sealed to the coupler by deformable O-rings. Because O-rings are typically made from a non-conductive material such as rubber or rubber compounds, the O-rings electrically insulate the coupled sections of the lines from each other. Therefore, any ionization of fuel that flows through the lines can give rise to differential electrostatic charges between the coupled sections. There remains a need to ensure electrical conductivity across coupled sections of fuel lines to prevent electrostatic buildup considering the continued use of O-rings in modern coupler designs.

There are various types of known electrical jumpers, also referred to as bonding jumpers or bonding rings, used to eliminate the hazard of differential electrostatic charges. In short, a bonding jumper provides an electrically conductive connection between the coupled sections of a fluid line to prevent or limit buildup of electrostatic charges within the coupler. Bonding jumpers can be generally categorized within two types, namely, exteriorly mounted jumpers and interiorly mounted jumpers. For exteriorly mounted bonding jumpers, these may require some degree of assembly and disassembly, which therefore makes exteriorly mounted jumpers more difficult to use. For interiorly mounted jumpers, these may include various forms of electrical conductive material such as springs or wires that are retained within the coupling placed in intimate contact with the coupled flanges of the fuel lines, thereby maintaining electrical conductivity between the flanges of the fluid conveying lines. One particular disadvantage of many types of interiorly mounted bonding jumpers is that there is no means to visually inspect whether the bombing jumpers are properly positioned to make from contact with the flanges. Another disadvantage to these interiorly mounted jumpers is that the jumpers cannot be modified or replaced, since they typically are permanently mounted within the coupler.

Examples of exteriorly mounted jumpers include those disclosed in U.S. Pat. Nos. 4,008,937; 4,346,428; 4,881,760; 4,900,070; 5,188,400; and 5,620,210.

Examples of interiorly mounted jumpers include those disclosed in U.S. Pat. Nos. 4,487,462; 4,808,117; 5,959,828; 6,880,859; 6,883,836; and 7,222,889.

Another method of preventing buildup of electrostatic charge may include use of conductive coatings applied to a coupling assembly and/or to the flanges of the fluid conveying members. Examples of references disclosing conductive coatings include the U.S. Pat. Nos. 5,786,976 and 5,959,828.

Despite the numerous available designs for bonding jumpers, there still a need to provide a bonding jumper that can be used to handle wide ranges of electrical amperages that may be present, as caused by numerous sources of electrical charges, to include both passive and dynamic sources. There is also a need to provide a bonding jumper that is easy to install, and can be used to supplement an existing bonding jumper capability for those couplers it may have an integral bonding jumpers.

SUMMARY OF THE INVENTION

In accordance with the present invention, a bonding clip is provided for use with a fluid conduit coupler in order to conduct electrical charge across the coupler, and in which the bonding clip is capable of handling wide ranges of electrical current, thereby providing a viable solution for not only lower levels of electrostatic charge buildup, but also much higher amperages associated with dynamic sources of electrical current such as lightning strikes.

In one aspect of the invention, it may be considered a bonding clip. In another aspect of the invention, it may be considered a combination including the bonding clip and coupler. In yet another aspect of the invention, it may be considered a method for dissipating electrostatic charge across a coupler used to interconnect fluid conveying members.

In a preferred embodiment of the bonding clip, it includes a flexible wire element that is mounted exteriorly of the coupler. The bonding clip is a continuous piece of electrically conductive material formed in a shape to connect to the facing flanges of adjacent fluid conveying lines. More specifically, the bonding clip includes a bridge section that passes over the coupling, and a pair of opposing arcuate contact sections that connect to the flanges of the respective fluid conveying lines; the flanges being connected to one another by the coupler. In order to prevent electrical charges from being inadvertently conveyed from the bridge section of the bonding clip back to the coupler, the bonding clip should only make contact with the flanges of the fluid conveying lines and with the opposite ends of the coupler. Therefore, the bonding clip is securely mounted to both flanges and the bonding clip is held against the coupler ends; however, the bridge portion of the clip extends over the coupler with a definable gap being present between the bridge portion of the bonding clip and the exterior surface of the coupler.

The arcuate contacts of the bonding clip are characterized by curved portions of the clip that maintain frictional contact with the flanges of the fluid conveying members. The arcuate contacts can be sized to match the particular diameter of the flanges to which the bonding clip is to be mounted. Optionally, the opposing ends of the bonding clip may terminate with bended portions, to assist a user in grasping and installing the bonding clip over the coupler. The particular geometry of the arcuate contacts as formed may be configured to require the contacts to be spread apart from one another when the bonding clip is installed over the coupler. Thus, a compressive spring force is present when the clip is installed over the coupler to contribute to a secure mounting of the bonding clip over the coupler and in contact with the flanges.

One distinct advantage associated with the exteriorly mounted bonding clip of the present invention, is that it can be easily sized to match various types of couplers and electrostatic dissipation requirements. That is, the particular gauge of the wire used for the bonding clip can be selected to handle wide ranges of electrostatic charges that must be dissipated. Further, the wire construction allows the clip to be easily shaped and re-shaped for varying coupler designs. Although the bonding clip is exteriorly mounted, it does not substantially change the overall dimensional profile of the coupler, therefore allowing the bonding clip to be used within small open spaces. Also, because the clip is exteriorly mounted, it is easily viewed by a user to confirm it is properly installed.

The bonding clip of the present invention can be used with many different types of couplers to include full circumferential couplers, as well as clamshell type couplers. The length and rise of the bridge portion of the bonding clip can be shaped to match any type of coupler, which further provides great flexibility in use of the bonding clip for many applications.

According to the above described features of the invention, it therefore can be described in one aspect, as a bonding clip especially adapted for installation over a fluid conduit coupling that interconnects to fluid conveying members, the bonding clip comprising: (i) a bridge portion; (ii) a pair of leg portions each having first and second ends, the first ends of the leg portions connected to respective opposite ends of the bridge portion; and (iii) a pair of arcuate shaped contacts each having first and second ends, the first ends of the arcuate shaped contacts connected to respective second ends of the pair of leg portions.

In another aspect of the invention, it may be considered as a combination, namely a fluid conduit coupling and a bonding clip installed over the fluid conduit coupling, the combination comprising: (a) a fluid conduit coupling including (i) a first coupler member placed in contact with abutting flanges of corresponding fluid conveying members, (ii) a second coupler member placed circumferentially over at least a portion of the first coupler member for stabilizing a connection between the coupler and flanges, and (iii) a locking ring mounted over at least one of the first and second coupler members for selectively locking and unlocking the coupling; and (b) a bonding clip comprising (i) a bridge portion, (ii) a pair of leg portions each having first and second ends, the first ends of the leg portions connected to respective opposite ends of the bridge portion, and (iii) a pair of arcuate shaped contacts each having first and second ends, the first ends of the arcuate shaped contacts connected to respective second ends of the pair of leg portions; and wherein the bonding clip is mounted to the fluid conduit coupling such that one arcuate shaped contact is placed over and connected to one flange, the bridge portion extends over and is spaced from the fluid conduit coupling, and the other arcuate shaped contact is placed over and connected to the other flange.

In yet another aspect of the invention, it may be considered a method for dissipating electrostatic charge across a coupling used to interconnect fluid conveying members, the method comprising: (i) providing a bonding clip, the bonding clip including two contact portions that contact respective fluid conveying members or contact respective flanges of the fluid conveying members connected by the coupling, the bonding clip further including a bridge portion extending between the contact portions; (ii) attaching the contact portions to the respective fluid conveying members or flanges; and (iii) disposing the bridge portion so that it extends over and spaced from the exterior surface of the coupling.

Other features and advantages of the invention will become apparent from a review of the following detailed description, taken in conjunction with the drawings.

DETAILED DESCRIPTION

Figure 1:
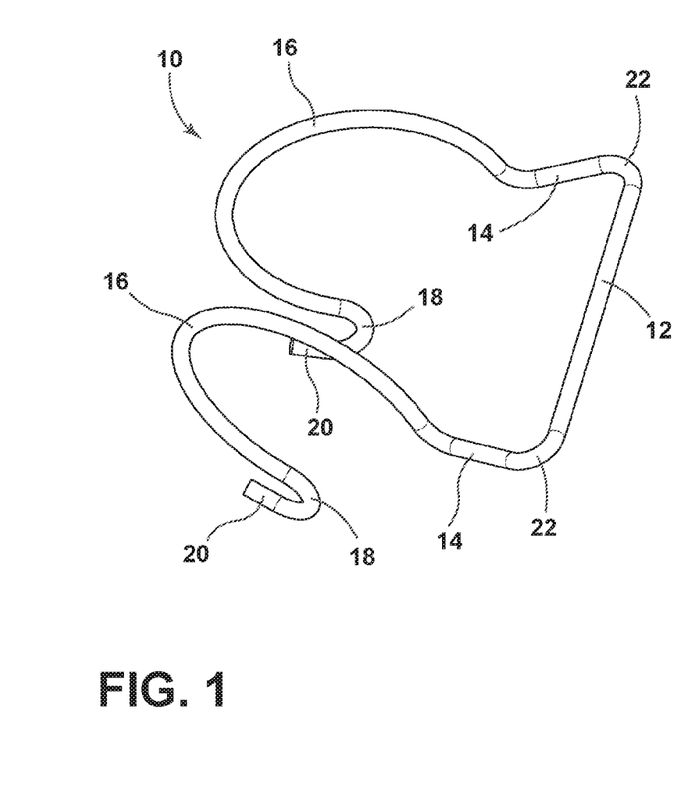
FIG. 1 is an enlarged perspective view of the bonding clip of the present invention, showing the bonding clip in its geometric configuration prior to being installed over a coupler.
Figure 2:
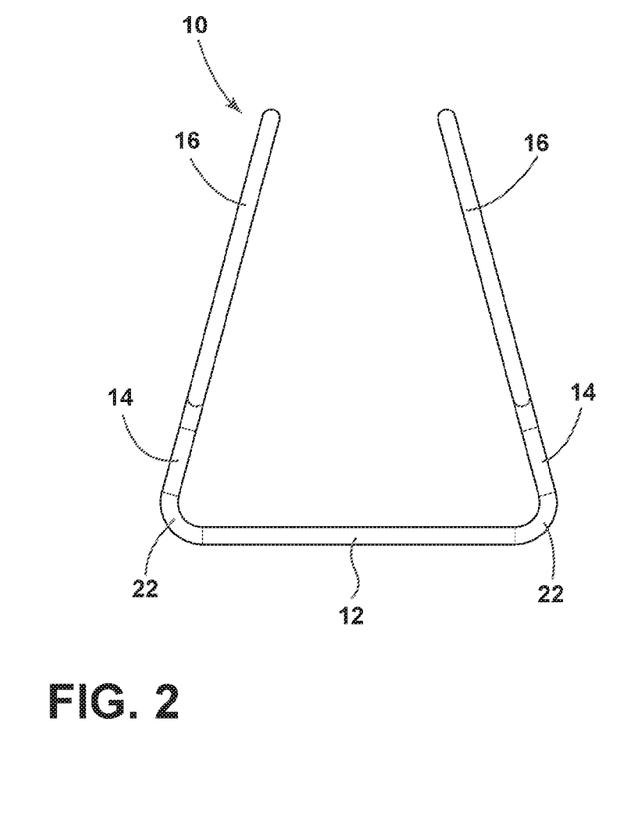
FIG. 2 is an enlarged end view of the bonding clip of FIG. 1, also showing the bonding clip in its geometric configuration prior to being installed over a coupler.

Referring to FIGS. 1 and 2, the bonding clip 10 of the present invention is illustrated. The bonding clip can be constructed from a continuous piece of metallic material, such as a piece of wire having a gauge that is capable of conducting electric current within specified ranges. Example materials that can be used for the bonding clip include stainless steel, bronze, and copper. The bonding clip 10 has a bridge portion 12 that passes over the coupler, and the rise or height of the bridge portion 12 is defined by opposing leg portions 14 that can be selectively sized to provide a gap or clearance between the bridge portion 12 and the exterior surface of the coupler, as discussed further below. The legs 14 each connect to respective arcuate shaped contacts 16. The arcuate shaped contacts 16 are mounted over and make frictional contact with the respective flanges of fluid conveying members joined by the coupler. The arcuate shaped contacts 16 also sized such that they maintain adequate frictional engagement with the respective flanges to prevent inadvertent shifting or movement of the bonding clip when installed. Accordingly, the arcuate shaped contacts can be bent to a specified angularity and/or diameter such that the contacts 16 maintain adequate frictional engagement with the respective flanges. Optionally, the ends of the bonding clip 10 may include respective bends 18 and distal extensions 20 that may assist a user in manipulating the bonding clip for mounting or for removal of the bonding clip. Referring specifically to FIG. 2, it is shown that the arcuate shaped contacts 16 and leg portions 14 extend substantially linearly or planar, and the corners 22 interconnecting the ends of the bridge portion 12 and the respective leg portions 14 can be bent so that the leg portions 16 and contacts 16 are slightly angled toward one another.

Figure 3:
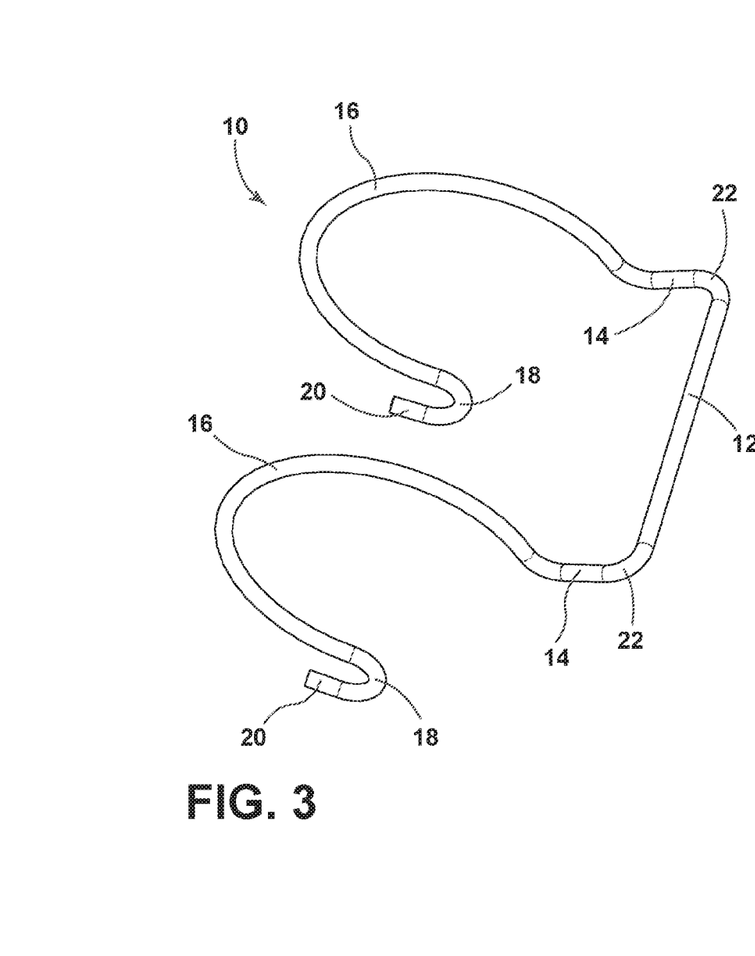
FIG. 3 is an enlarged perspective view of the bonding clip of FIG. 1, showing the bonding clip in its geometric configuration after being installed over a coupler.
Figure 4:
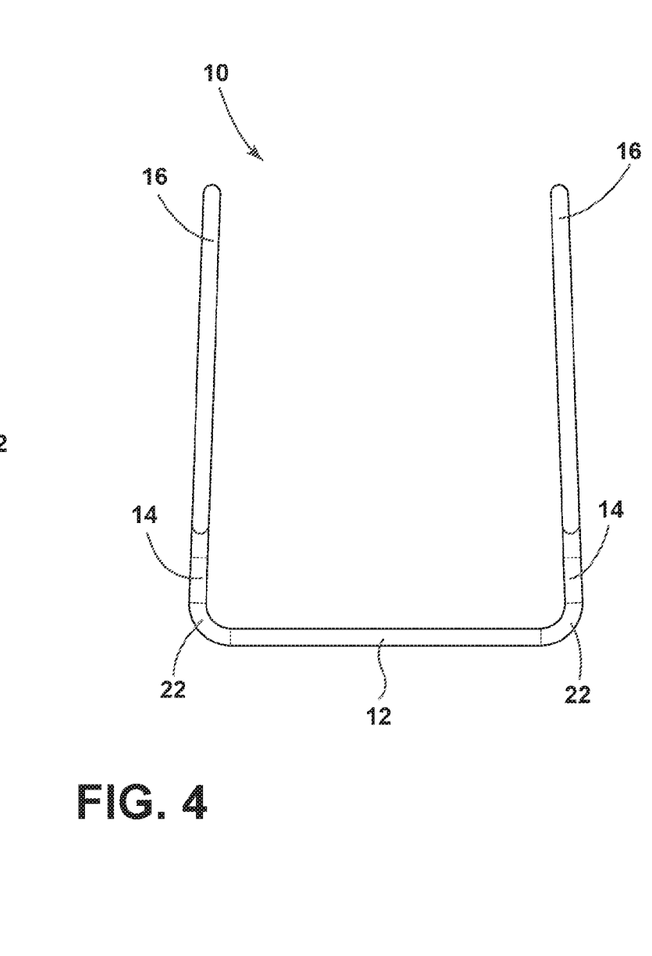
FIG. 4 is an enlarged end view of the bonding clip of FIG. 1, also showing the bonding clip in its geometric configuration after being installed over a coupler.

Referring to FIGS. 3 and 4, these figures illustrate the bonding clip 10 as if installed over a coupler. As best seen in FIG. 4, the leg portions 14 and contacts 16 extend more parallel to one another in which the bends formed at the corners 22 enable the clip to provide a compressive spring force against the ends of the coupler, as further discussed in reference to the other figures. In order to ensure a secure connection between the bonding clip 10 and the portions of the coupler contacted by the bonding clip, the particular angle at which the corners 22 are bent can be adjusted to provide an optimal spring force. The spacing and size of coupling components will differ among fluid conveying systems, and accordingly, the bend angles at the corners 22 may be modified to accommodate these different components.

Figure 5:
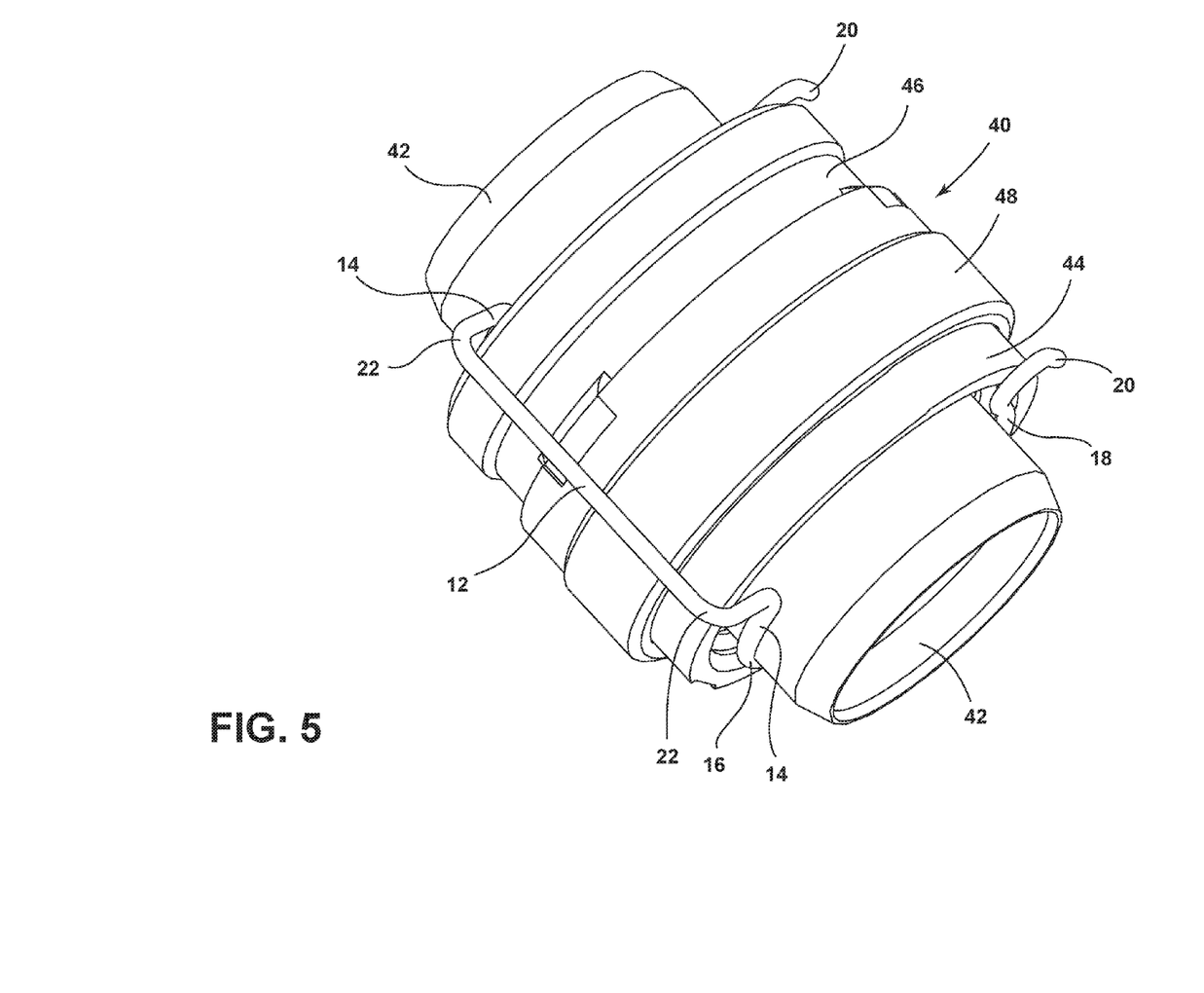
FIG. 5 is a perspective view of the bonding clip installed over an example coupler.
Figure 6:
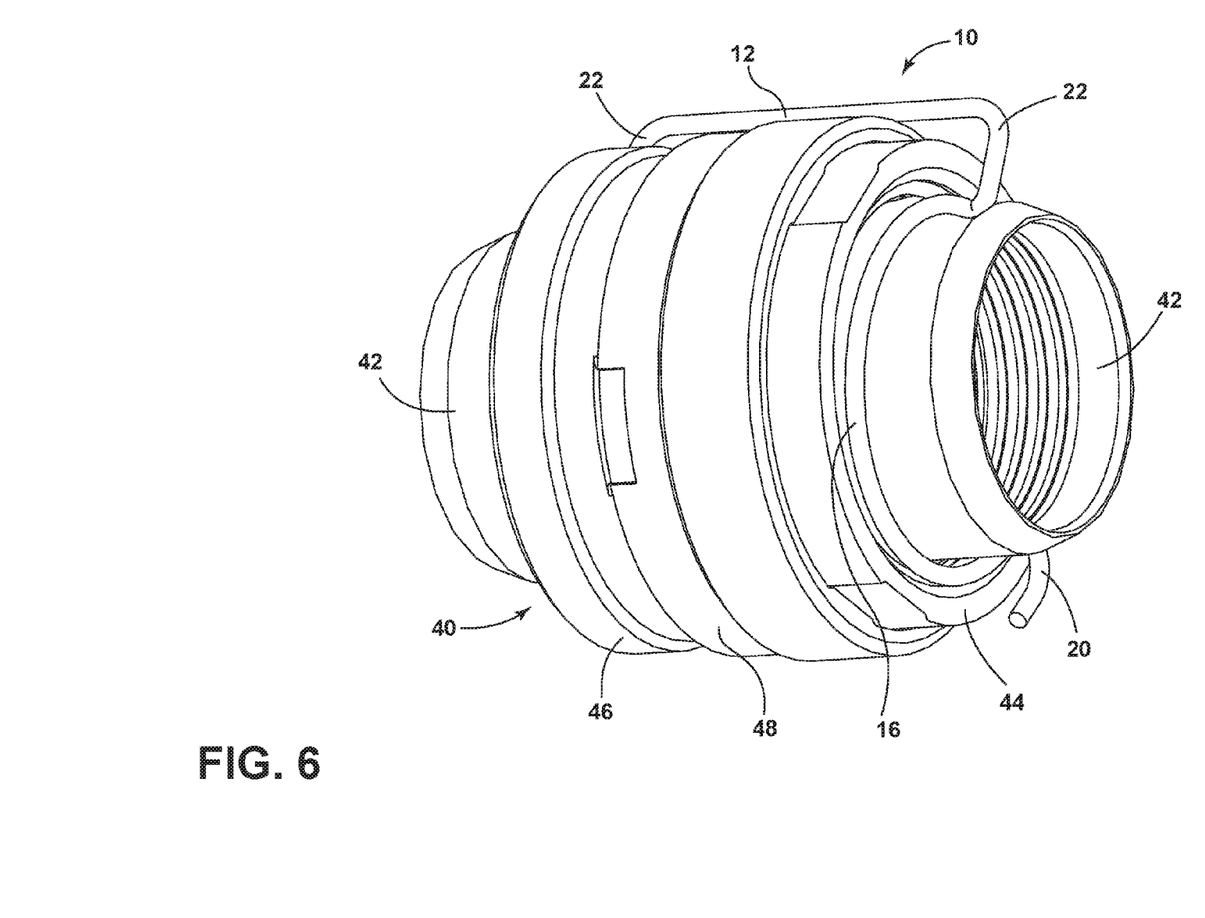
FIG. 6 is another perspective view of the bonding clip installed over the coupler shown in FIG. 5.

Referring to FIGS. 5 and 6, the bonding clip 10 is shown in a mounted position over a coupler 40 and secured to respective flanges 42. The flanges 42 connect to the ends of respective fluid conveying lines (not shown). Typically, the flanges 42 are connected to their respective fluid conveying tubes/members by swage connections. The type of coupler 40 illustrated in FIGS. 5 and 6 represents what has been referred to herein as a full circumferential coupler; however, the coupler 40 is intended to represent any type of coupler used to interconnect to fluid conveying members. Therefore, the particular configuration of the coupler 40 should not be deemed as limiting with respect to the bonding clip of the present invention.

The design of the coupler 40 as illustrated more specifically corresponds to positive lock coupling designs, and one example of such a design is disclosed in the U.S. Pat. No. 5,871,239. This reference is incorporated herein by reference in its entirety for purposes of disclosing an example coupling device used to interconnect fluid conveying members, to specifically include those types of fluid conveying members especially adapted for conveying fuel. The coupler 40 includes a first coupler member 44, a second coupler member or nut 46, and a lock ring 48 used to lock or hold the first and second coupler members in place.

As further shown in FIGS. 5 and 6, the arcuate shaped contacts 16 are fitted over and frictionally engage the respective flanges 42. The legs 14 extend radially away from the longitudinal axis of the coupler 40, and to a distance that allows the bridge 12 to pass longitudinally over the coupler 40. The lower ends of the legs 14 contact the opposite exposed side edges of the coupler 40, and a compressive spring force is provided by the legs 14 that are urged normally toward one another. Accordingly, also referring to FIGS. 7 and 8, one leg 14 contacts the side edge 45 of the first coupler member 44, and the other leg 14 contacts the opposite side edge 47 of the nut 46. The bridge 12 of the bonding clip 10 should preferably not contact the coupler 40 so that the electrical charges to be conducted can be directly transferred between the connected fluid conveying members, and to prevent an inadvertent electrical path for the electrical charge to return to the coupler 40.

FIGS. 5 and 6 also illustrate the relatively unobtrusive mounting arrangement for the bonding clip 10 in which the profile of the coupler is not substantially altered, thereby enabling the bonding clip 10 to be used within tight spaces. In testing, it is been found that maintaining a clearance or gap of approximately 0.25 inch between the elements of the bonding clip and the coupler is adequate to prevent inadvertent arcing of electrical charge from the bridge of the bonding clip to the coupler in a typical installation; however this dimension can be varied based on electrical current requirements for specific lightning waveforms.

Referring again to FIGS. 7 and 8, cross-sectional views of the coupler 40 are illustrated for purposes of further viewing the spacial relationship between the bonding clip 10 and the coupler. As mentioned, the particular design of the coupler 40 illustrated is similar to that shown and described in U.S. Pat. No. 5,871,239; however, it again shall be understood that the bonding clip 10 of the invention is not limited to use of any particular coupler design.

Figure 7:
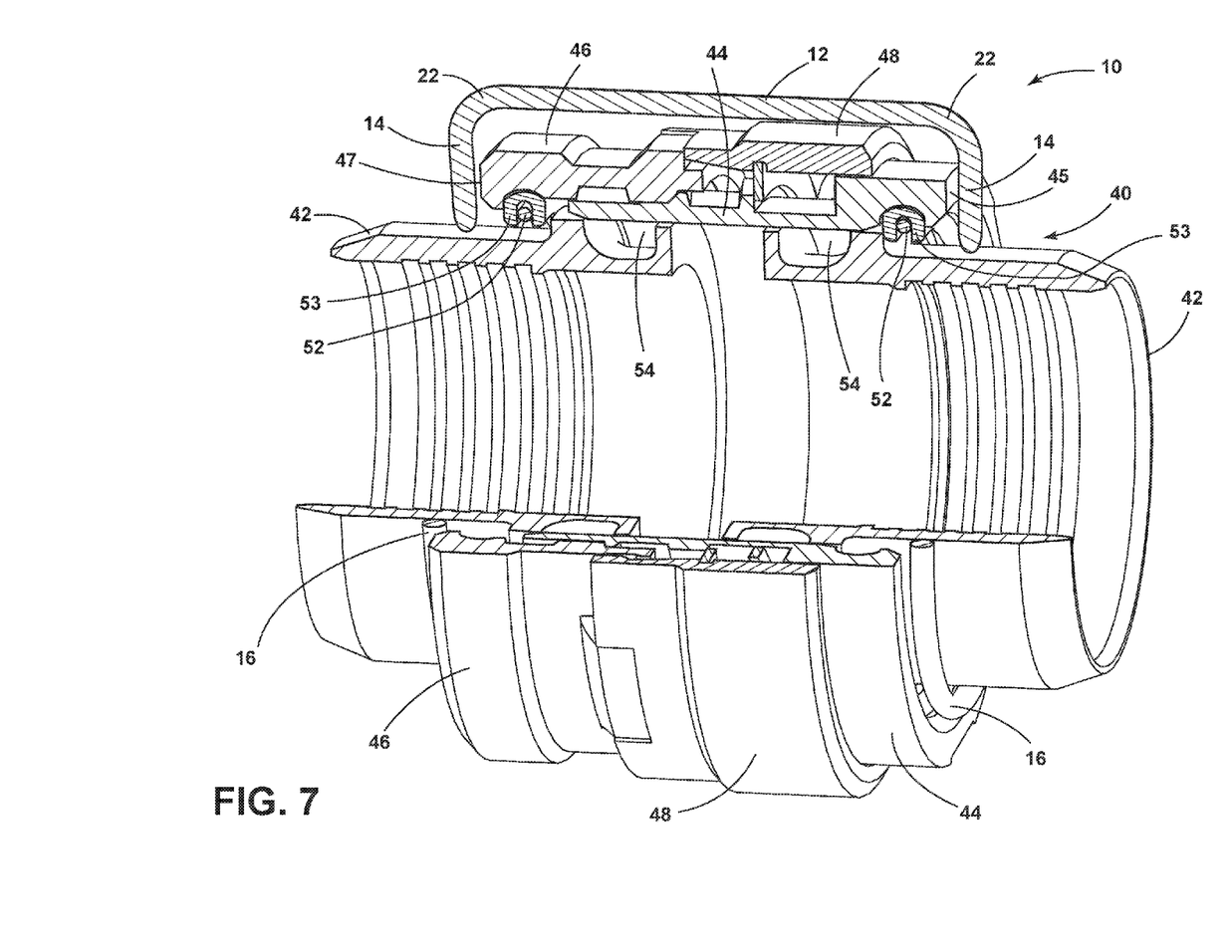
FIG. 7 is a fragmentary cross-sectional and perspective view of the bonding clip installed over the coupler illustrated in FIG. 5, showing internal details of the coupler.
Figure 8:
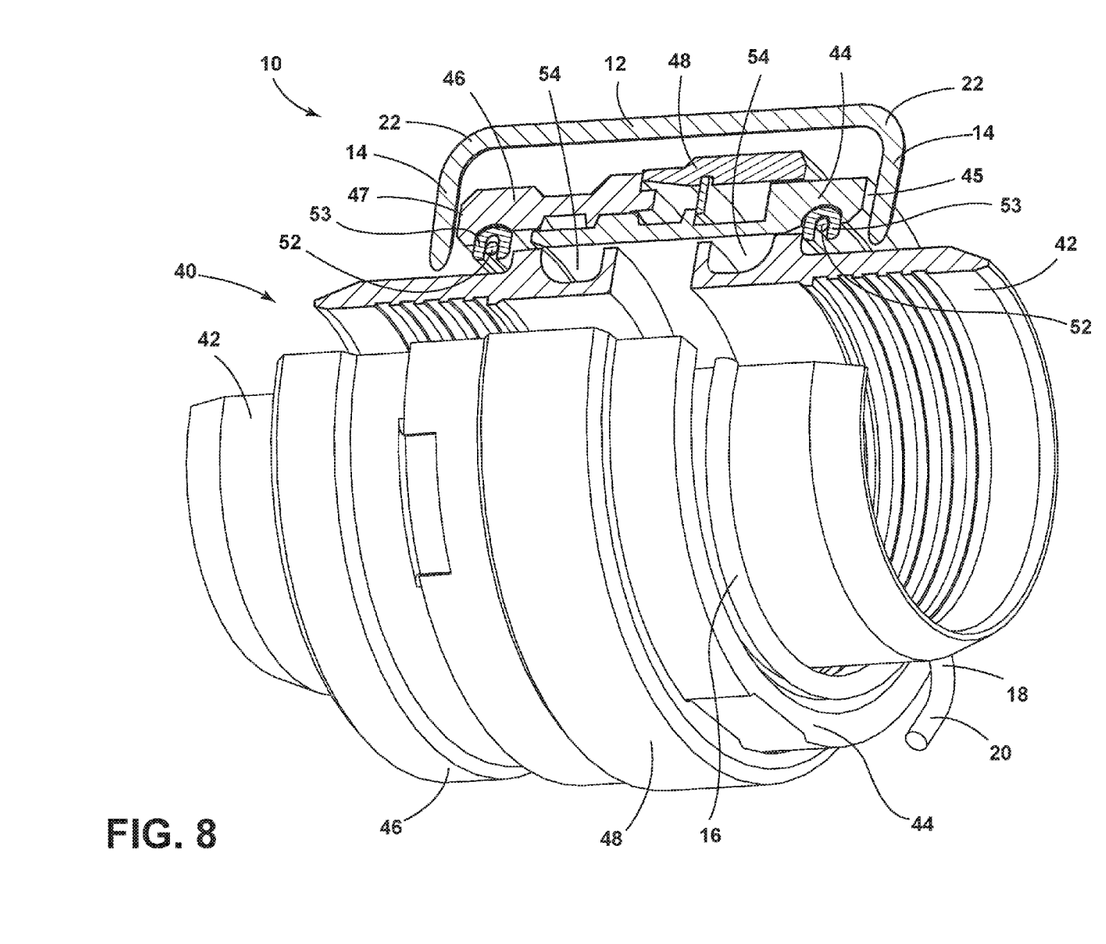
FIG. 8 is another fragmentary cross-sectional and perspective view of the bonding clip installed over the coupler illustrated in FIG. 5.

The buildup of electrostatic charges is a consequence for the great majority of couplers that must maintain fluid tight seals to prevent leakage of fluid. A compressible element must typically be used to seal the coupler elements, such as use of compressible O-rings that have limited electrical conductivity. In the example of FIGS. 7 and 8, O-rings (not shown) are placed within the peripheral grooves 54 of the flanges 42. When installed, the O-rings provide a fluid tight seal between the flanges 42 and the interior surface of the first coupler member 44. Additional details are also illustrated in FIGS. 7 and 8 for the coupler 40, namely, the presence of interiorly mounted bonding wires 52 for achieving electrical conductivity across the coupler 40. The bonding wires 52 are held within respective retaining rings 53 and the retaining rings 53 are mounted within the respective annular grooves as shown.

In the example coupler 40, the interiorly mounted bonding wires may not be adequate for achieving the required electrical conductivity and the bonding clip 10 is therefore used to supplement bonding capabilities of the coupling to handle wider ranges of voltages and amperages. In the case of a coupler having no integral bonding wire components, the bonding clip of the present invention can be used as the single and primary means to dissipate electrostatic charge within the coupler.

Figure 9:
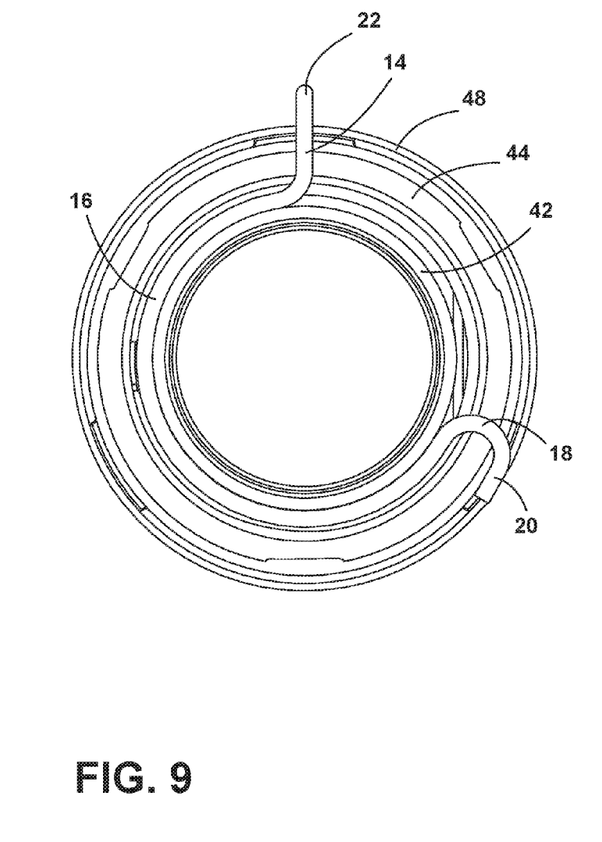
FIG. 9 is an end view of the bonding clip installed over the coupler illustrated in FIG. 5.
Figure 10:
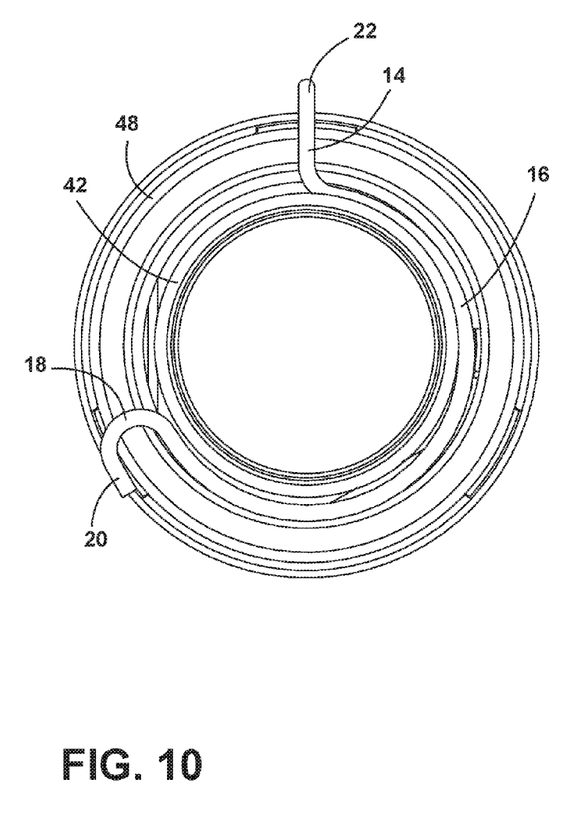
FIG. 10 is an opposite end view of the bonding clip installed over the coupler illustrated in FIG. 5.

Referring to FIGS. 9 and 10, end views of the bonding clip 10 mounted to the flanges 42 are provided for better illustrating the manner in which the arcuate contacts 16 mount to their respective flanges, as well as to further illustrate the non-obtrusive manner in which the bonding clip resides in its mounted position. From these views, it is apparent that the cross-sectional profile of the coupler 40 is only altered by the relatively small height to which the bridge portion 12 extends above the coupler 40. As also shown, the bends 18 and distal extensions 20 of the bonding clip are formed so that they do not protrude beyond the diameter of the coupler 40.

The invention also includes a method for dissipating electrostatic charge across a coupling used to interconnect fluid conveying members. According to the method, a bonding clip is provided, and is selectively mounted over a coupler/coupling used to interconnect fluid conveying members. The bonding clip includes two contact portions that contact the respective fluid conveying members or contact respective flanges of the fluid conveying members attached to confronting ends of the fluid conveying members. The bonding clip further includes a bridge portion that passes over the coupler, and is separated from the coupler to prevent contact between the coupler and bridge portion, and to prevent arcing of an electrostatic charge between the coupler and bonding clip. The contact portions of the bonding clip are secured to the respective fluid conveying members/flanges, and the bridge portion is therefore placed in a position such that it passes over the coupler and not in contact with the coupler. The bonding clip has two geometric configurations; a first geometric configuration prior to being installed, and a second geometric configuration after installation in which one or more of the elements of the bonding clip deflect or bend. The second configuration results in the creation of a compressive spring force used to assist in maintaining the bonding clip in a securely mounted position to prevent undesirable shifting of the bonding clip when installed.

There are a number of advantages to the bonding clip of the present invention. The bonding clip has a relatively simple construction, and can be conveniently mounted over standard fluid conveying couplers without the need for special installation tools. The bonding clip is a one-piece element; therefore, there is no assembly or disassembly required. The bonding clip is easily visually inspected to ensure that the clip is properly installed. Use of a geometrically configured wire material enables the particular shape of the bonding clip to be easily adapted for different types of couplers not only to achieve adequate frictional engagement with flanges of the fluid conveying lines, but also to provide different arrangements by which the bridge portion may pass over the coupler.

Although the bonding clip and method of the invention have been disclosed with respect to preferred embodiments, it is contemplated that the bonding clip and method can be modified commensurate with the scope of the claims appended hereto.

What is claimed is:

1. In combination, a fluid conduit coupling and a bonding clip installed over the fluid conduit coupling, said combination comprising:
a fluid conduit coupling including (i) a first coupler member placed in contact with abutting flanges of corresponding fluid conveying members, (ii) a second coupler member placed circumferentially over at least a portion of the first coupler member for stabilizing a connection between the coupler and flanges, and (iii) a locking ring mounted over at least one of the first and second coupler members for selectively locking and unlocking the coupling;
a bonding clip comprising (i) a bridge portion, (ii) a pair of leg portions each having first and second ends, said first ends of said leg portions connected to respective opposite ends of said bridge portion, and (iii) a pair of arcuate shaped contacts each having first and second ends, said first ends of said arcuate shaped contacts connected to respective second ends of said pair of leg portions; and
wherein said bonding clip is mounted to the fluid conduit coupling such that one arcuate shaped contact is placed over and connected to one flange, said bridge portion extends over and is spaced from said fluid conduit coupling, and the other arcuate shaped contact is placed over and connected to the other flange.

2. The combination of claim 1, further including:
a bend incorporated at each second end of said pair of arcuate shaped contacts, and a distal extension extending from each bend, said distal extensions forming opposite ends of said bonding clip.

3. The combination of claim 1, wherein:
connected pairs of said leg portions and said arcuate shaped contacts each extend substantially planar to one another.

4. The combination of claim 1, wherein:
connected pairs of said leg portions, said arcuate shaped contacts, and said distal extensions each extend substantially planar to one another.

5. The combination of claim 1, wherein:
connected pairs of said leg portions and said arcuate shaped contacts extend substantially planar and extend toward one another at an angle prior to installation.

6. The combination of claim 1, wherein said fluid conduit coupling includes an internal bonding wire.

7. The combination of claim 1, wherein said bridge portion is disposed substantially parallel with a longitudinal axis of the coupling.

8. The combination of claim 1, wherein said second coupler member includes a nut.

9. The combination of claim 1, wherein each of said arcuate shaped contacts is configured to independently maintain frictional contact with respective flanges of said fluid conveying members.

10. The combination of claim 1, wherein said bonding clip is configured to provide an electrical connection between a first fluid conveying member and a second fluid conveying member of said corresponding fluid conveying members.

11. A method for dissipating electrostatic charge across a coupling used to interconnect fluid conveying members, said method comprising:
providing a bonding clip including two contact portions that contact respective fluid conveying members or contact respective flanges of the fluid conveying members connected by the coupling, said bonding clip further including a bridge portion extending between and interconnecting the contact portions;
attaching the contact portions to the respective fluid conveying members or flanges;
configuring the bridge portion so that it extends over and is spaced from exterior surfaces of the coupling; and
dissipating electrostatic charge across the coupling.

12. The method of claim 11, wherein:

dissipating electrostatic charge across the coupling includes dissipating electrostatic charge across the coupling without electrical arcing between the bridge portion and the exterior surfaces of the coupling.

13. The method of claim 11, wherein:

the bonding clip further includes a bend incorporated at each second end of said contact portions, and a distal extension extending from each bend, said distal extensions forming opposite ends of said bonding clip, and attaching the contact portions to the respective fluid conveying members or flanges includes applying force to said bends and said distal extensions.

14. The method of claim 11, wherein:

connected pairs of leg portions and said contact portions of said bonding clip each extend substantially planar to one another; and configuring the bridge portion so that it extends over and is spaced from exterior surfaces of the coupling includes disposing said leg portions such that the bridge portion extends over and is spaced from exterior surfaces of the coupling.

\* \* \* \* \*